Dec. 9, 1947.    J. VAN SLOOTEN ET AL    2,432,183
FREQUENCY CONVERTER SYSTEM
Filed May 21, 1943
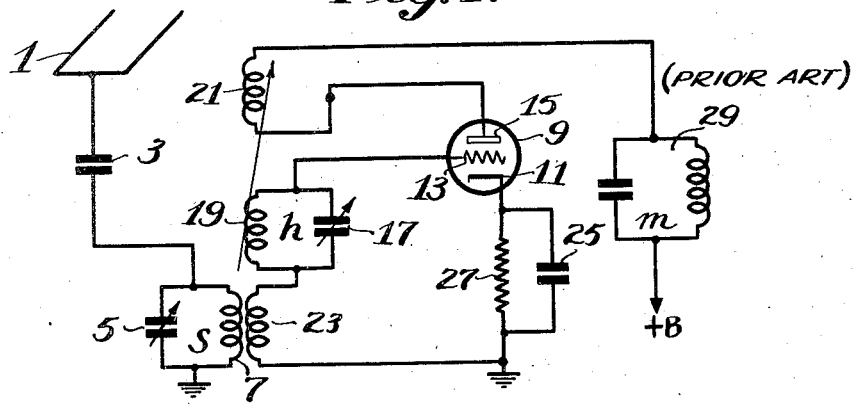
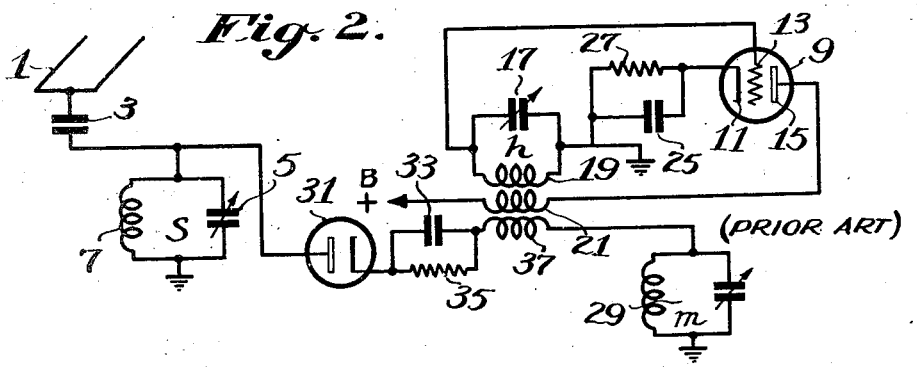
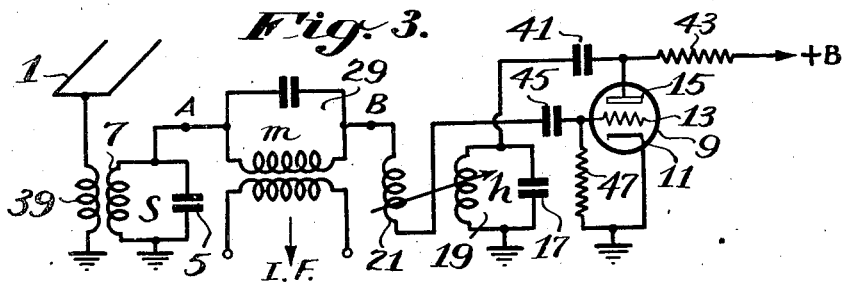
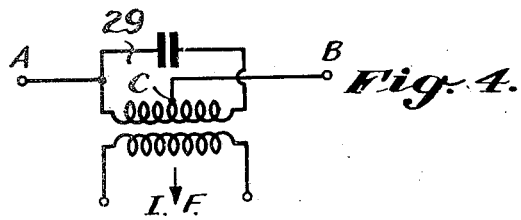
INVENTORS.
JACOB VAN SLOOTEN
ADELBERT VAN WEEL
BY
ATTORNEY Patented Dec. 9, 1947

2,432,183

UNITED STATES PATENT OFFICE 2,432,183

FREQUENCY CONVERTER SYSTEM

Jacob van Slooten and Adelbert van Weel, Eindhoven, Netherlands, assignors to Hartford National Bank and Trust Company, Hartford, Conn., as trustee Application May 21, 1943, Serial No. 487,982
In the Netherlands September 11, 1940

Section 1, Public Law 690, August 8, 1946
Patent expires September 11, 1960

3 Claims. (Cl. 250—20)

The present invention relates to frequency converter or mixing circuits such as used, inter alia, in superheterodyne receivers and more particularly to mixing circuits in which the grid of an oscillating tube has supplied to it the alternating voltage to be mixed with the oscillations generated by this tube.

As is well-known wave-length transformation in a superheterodyne receiver takes place by jointly supplying oscillations of the frequency to be received and locally produced oscillations to a device having a non-linear current-voltage characteristic. In this way oscillations ensue, inter alia, of the sum and the difference frequency of the initial oscillations. In literature many examples of circuits using a minimum of apparatus are found. A number of these circuits are so constructed that the control-grid of the oscillating tube has supplied to it the alternating voltage to be mixed with the oscillations produced by this tube. Fig. 1 of the accompanying drawing represents an example of such a circuit.

In this example an antenna 1 is coupled through a condenser 3 to a tuned circuit consisting of a condenser 5 and a coil 7. A triode 9 comprising a cathode 11, a grid 13 and an anode 15 is connected as a generator. To this end the grid circuit comprises a tuning circuit consisting of a condenser 17 and a coil 19, the anode circuit comprising a coil 21 which is coupled with coil 19. Between the said tuning circuit and the cathode 11 is furthermore connected a coil 23, which is coupled with coil 7, and a resistance 27 shunted by a condenser 25, which resistance provides for correct grid bias of the tube 9. The anode circuit comprises also the tuned circuit 29 connected between the feedback coil 21 and a source of anode potential indicated at +B.

The operation of the device is as follows:

The circuit 5, 7 is tuned to the frequency $s$ of the signals to be received, and the circuit 17, 19 is tuned to the frequency $h$ which differs therefrom by an amount corresponding to the desired intermediate frequency $m$. Consequently, the tube 9 will generate oscillations of the frequency $h$ so that as a result of the coupling between coils 7 and 23 the grid 13 has supplied to it both an alternating voltage of the frequency $s$ and an alternating voltage of the frequency $h$. Owing to the non-linear operation of the tube 9 oscillations, inter alia, of the intermediate frequency $m=h-s$ (if $h \rightarrow s$) will occur in the anode circuit, which oscillations can be taken from the circuit 29 tuned to this frequency.

It has been found, however, that especially with short and ultra-short waves a high and annoying noise level occurs in many of the customary mixing circuits. One of the expedients which have come to be known of late to lower the noise level consists in the use of a diode as a mixing tube. A circuit according to this principle is represented in Fig. 2.

In this figure elements having the same function as in Fig. 1 are designated by the same reference numerals. Furthermore the circuit comprises a diode 31 together with a resistance 35 shunted by a condenser 33, and a coil 37 which is coupled with coil 21 and thus provides that the oscillations generated by the tube 9 are supplied to the diode 31.

The operation of the circuit is as follows:

The circuit 5, 7 is adjusted again to the frequency $s$, and the circuit 17, 19 is adjusted to the frequency $h$ so that currents of both frequencies traverse the diode. Owing to the non-linear characteristic of the diode there also occur oscillations of the frequency $m=h-s$ which can be taken from the circuit 29 tuned to this frequency. The resistance 35 provides for correct adjustment of the diode.

According to the invention a substantial simplification in the construction of a diode mixing device can be obtained in a circuit utilizing a triode oscillating tube, by having the received signal oscillations impressed on the grid of this tube, and by taking the oscillations of the sum- or difference-frequency from a resonant circuit interposed in the grid-circuit of said tube and tuned to the sum- or difference frequency. According to the invention the voltage thus obtained may preferably still be stepped up before being supplied to the load.

The invention is substantially based on the fact that the grid-cathode space of the generator tube is utilised as a mixing diode.

The operation will be more fully explained by reference to Fig. 3 representing an embodiment of the invention.

In this figure elements having the same function as in Figures 1 and 2 also bear the same reference numerals. In this case the antenna is coupled through a coupling coil 39 to the circuit 5, 7 to be tuned to the incoming signals. The circuit 29 is tuned to the desired intermediate frequency $m$. The generator tube 9 comprising the cathode 11, the grid 13 and the anode 15 is connected in a somewhat different manner than in Figures 1 and 2. In this case the anode-circuit comprises the circuit 17, 19 tuned to the frequency $h$, and the reaction coil 21 is included in the grid-circuit. A blocking condenser 41 permits the condenser 17 to be earthed at one side; the anode-voltage is supplied through a resistance 43. A grid-condenser 45 and a leakage-resistance 47 provide for correct adjustment of the tube 9 as is customary in a generator circuit in such manner that when no signals are picked up by the antenna the positive voltage peaks of the oscillations generated by the tube in the grid-coil 21 will cause the passage of a small grid-current through the resistance 47.

When oscillations of the frequency $s$ are also supplied to the grid 13, components will occur having, inter alia, a frequency $m$ so that oscillations of this frequency can be taken from the circuit 29 tuned thereto, exactly as in the case with a diode.

It has been found that this mixing circuit has the same advantages as when use is made of a separate diode. Upon comparing the circuits of Figs. 2 and 3 it is obvious that the circuit according to the invention (Fig. 3) can be made in a much simpler and cheaper manner, since the diode 31, the condenser 33, the resistance 35 and the coil 37 in the former circuit are dispensed with in the circuit (Fig. 3) of the present invention.

According to the invention, the voltage of the sum- or difference-frequency set up across the resonant circuit tuned to this frequency and interposed in the grid-circuit, may advantageously still be stepped up which may be effected, for instance, by connecting the points A and B shown in Fig. 3 not in the manner illustrated in this figure but according to Fig. 4, wherein C represents a tap of the coil. In this way it is achieved that the impedance existing between A and B may be of the same order of magnitude as that of the circuit 5, 7, which is comparatively low for short waves, whilst the impedance for the intermediate-frequency can still attain a high value, so that a higher voltage of the desired frequency is set up throughout the coil or condenser of circuit 29.

What we claim is:

1. A frequency converter system comprising an electron discharge tube having at least a cathode, an anode and an interposed signal control grid, circuit elements connected to said tube electrodes adapted to cause said tube to function as a generator of local oscillations, means for impressing received signal oscillations on the signal grid of said tube, and means for deriving from the signal grid to cathode circuit of said tube the sum or difference frequency resulting from the interaction between said signal and locally produced oscillations.

2. A frequency converter system comprising an electron discharge tube having at least a cathode, an anode and an interposed signal control grid, circuit elements connected to said tube electrodes adapted to cause said tube to function as a generator of local oscillations, a pair of tuned circuits serially connected to the signal grid of said tube, one of said circuits being tuned to the frequency of received signal oscillations, and the other of said circuits being tuned to the sum or difference frequency resulting from the interaction between said signal and locally produced oscillations.

3. A frequency converter system comprising an electron discharge tube having at least a cathode, an anode and an interposed signal control grid, a tuned circuit connected to the anode and a coil, connected to the grid coupled to said circuit adapted to cause said tube to function as a generator of local oscillations, second and third tuned circuits serially connected between the grid coil and cathode, the second circuit being tuned to the frequency of received signal oscillations, and the third circuit being tuned to the sum or difference frequency resulting from the interaction between said signal and locally produced oscillations.

JACOB van SLOOTEN.
ADELBERT van WEEL.

REFERENCES CITED

The following references are of record in the file of this patent:

UNITED STATES PATENTS

| Number | Name | Date |
| --- | --- | --- |
| 1,997,393 | Roberts | Apr. 9, 1935 |
| 2,022,067 | Wheeler | Nov. 26, 1935 |
| 2,315,658 | Roberts | Apr. 6, 1943 |

FOREIGN PATENTS

| Number | Country | Date |
| --- | --- | --- |
| 552,486 | Great Britain | Apr. 9, 1943 |